June 19, 1951 F. W. PRESLAN 2,557,840
VALVE SEAT GAUGE
Filed Aug. 1, 1947
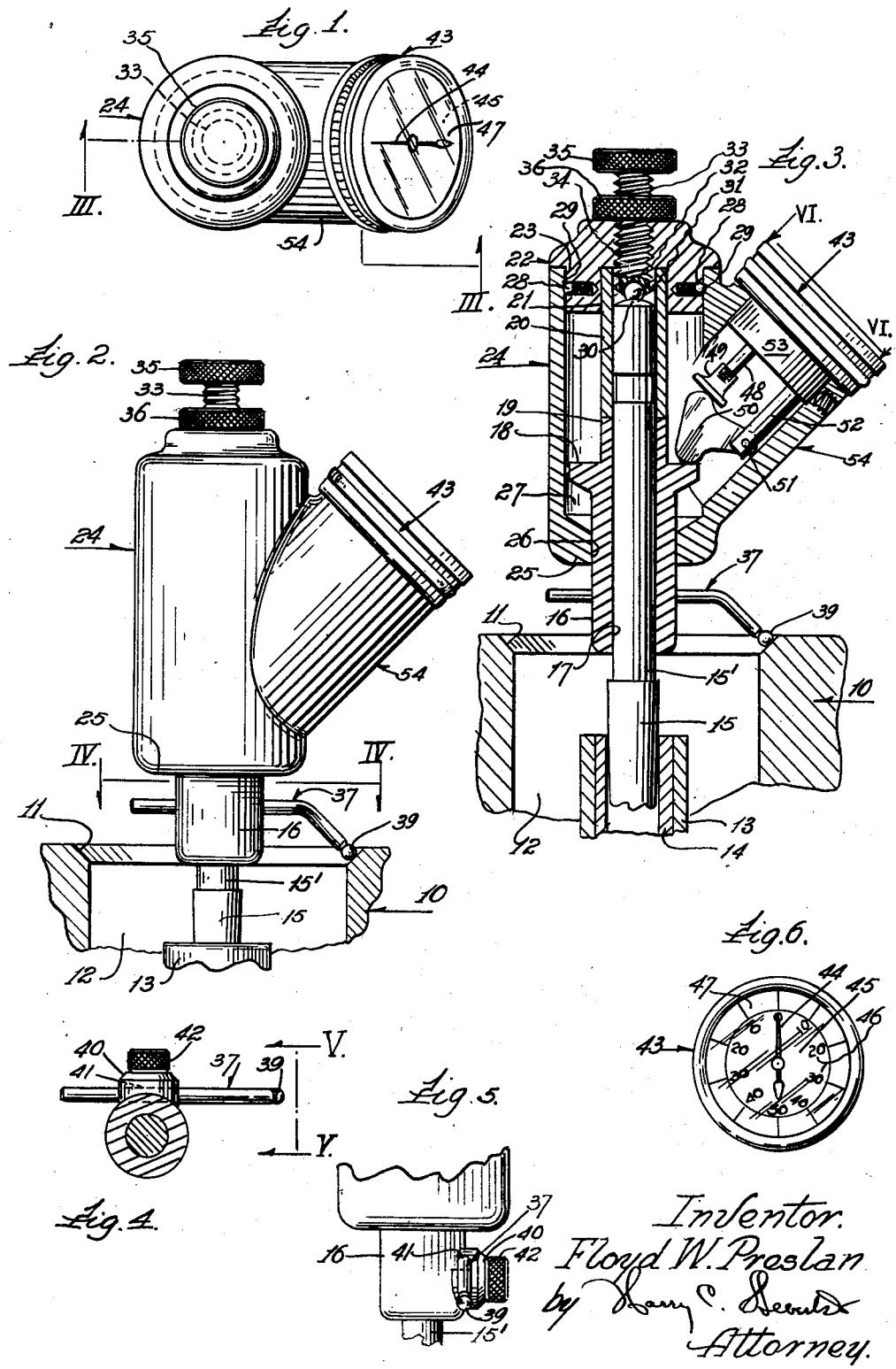
Inventor.
Floyd W. Preslan
by Larry C. Demkin
Attorney.

Patented June 19, 1951

2,557,840

UNITED STATES PATENT OFFICE 2,557,840

VALVE SEAT GAUGE

Floyd W. Preslan, Kenosha, Wis., assignor to Snap-On Tools Corporation, Kenosha, Wis., a corporation of Delaware Application August 1, 1947, Serial No. 765,297

12 Claims. (Cl. 33—172)

This invention relates to valve seat gauges and more particularly to valve seat eccentricity or concentricity and uniformity measuring instrumentalities, although certain features thereof may be employed with equal advantage for other purposes.

It contemplates more especially the provision of improved measuring instrumentalities to indicate the condition of engine valve seats prior, during, and after valve seat grinding and lapping operations, thereby marking the improvement in the valve seat after reconstruction.

Numerous types of devices or indicators for measuring valve seat eccentricity or the lack of concentricity have heretofore been proposed, and this invention relates to the type of indicator that remain stationary within a convenient observation position while the rotary part thereof is in movement for detecting non-uniformities, eccentricities or the lack of concentricity in valve seats. Such a construction places the indicator within convenient range of observation at all times so that the attendant can determine the degree of eccentricity and non-uniformity before, during, and after re-constructing the valve seat by grinding and/or lapping operations. Convenient observation from a fixed position or point of view, is labor saving and encourages more exacting work in the re-construction of valve seats so that more perfect results are obtainable therewith without entailing any appreciable time or labor.

One object of the present invention is to simplify the construction and improve the operation of devices of the character mentioned.

Another object is to provide an improved device for determining the concentricity or eccentricity of valve seats with respect to a valve guide.

Still another object is to provide an improved gauge mechanism which effectively checks the valve seat re-construction and re-seating operations.

A further object is to provide a valve seat gauge having relatively rotating parts which enables the indicator to be retained in a fixed position while the rotating parts transmit irregularities in the valve seat to the indicator.

A still further object is to provide an improved dial gauge for valve seats which is more simple, accurate, efficient, and provides a fixed position indicator relative to the rotatable measuring elements.

Still a further object is to provide an improved valve seat gauge structure of the stationary indicator type which is dependable, accurate, and more effective in operation.

Other objects and advantages will appear from the following description of an illustrative embodiment of the present invention:

In the drawing:

Figure 1 is a top plan view of the valve seat gauge embodying features of the present invention.

Figure 2 is a side view in elevation of the structure shown in Figure 1 as applied to a valve seat shown in section to clarify the illustrations.

Figure 3 is a sectional view in elevation taken substantially along line III—III of Figure 1.

Figure 4 is a sectional view taken substantially along line IV—IV of Figure 2.

Figure 5 is a fragmentary sectional side view in elevation of the gauge feeler mount viewed oppositely from the showing in Figure 2.

Figure 6 is a top plan view of the indicator viewed substantially from line VI—VI of Figure 3.

The structure selected for illustration is not intended to serve as a limitation upon the scope or teachings of the invention, but is merely illustrative thereof. There may be considerable variations and adaptations of all or part of the teachings depending upon the dictates of commercial practice. The present embodiment comprises an engine block 10 having a plurality of valve seats such as a tapered circumferential valve seat 11 which is representative and illustrative thereof.

The valve seat 11 communicates with the cylinder passage 12 which, in turn, communicates with the cylinders in an engine block 10. The cylinders are usually provided with valve stem guides 13 provided with bushings 14 therein to reciprocally guide valve stems comprising part of the valves which reciprocate in confronting relation with valve seats 11. The valve stem guides 13—14 are utilized in the re-construction of valve seats 11 to receive a pilot stem 15 which extends upwardly to provide a cylindrical guide body 15'. The cylindrical support body 16 has a vertical bore 17 therethrough to slidably and rotatively fit over the pilot or guide rod 15. The cylindrical support body 16 has a peripheral flange 18 formed intermediate the length thereof to merge in a reduced tubular extension 19 which is an integral part of the cylindrical support body 16 and peripheral flange 18.

A sleeve 20 conforming in diameter and bore with the cylindrical support body 16, the extension 19 and its bore 17, extends upwardly in axial alignment therewith for reception over the pilot guide body or stem 15 and is suitably connected with the extension 19 for rotation therewith. The sleeve 20 is press-fitted into an axial recess 21 provided in an end cap 22. The end cap 22 has a reduced peripheral shoulder 23 to rotatively receive a gauge support housing 24 thereon. The gauge support housing 24 terminates downwardly in a solid end 25 that is closed except for the vertical bore 26 therein which communicates with the interior chamber 27 of the gauge support housing 24. The sleeve 20 is axially separable relative to the tubular extension 19 for a limited extent determined by the distance between the peripheral flange 18 and the bottom end 25 of the support housing 24 (Figure 3) without being rotatively disconnected therefrom to detect irregularities in the valve seat 11 as will appear more fully hereinafter. This is rendered possible by providing the usual toothed clutch complements between the adjacent tubular members 19—20.

The vertical bore 26 in the lower end 25 of the gauge support housing 24, rotatively fits over the periphery of the cylindrical support body 16. So that rotation of the upper end cap body 22 with its attached depending sleeve 20 and axially attached cylindrical support body 16 may be effected relative to the gauge support housing 24, the body 16 rotates on the pilot guide or stem 15 so that the rotation thereof takes place relative to the gauge support housing 24. The gauge support housing 24 is maintained in assembled association with the end cap body 22 by means of a plurality of radially extending and circumferentially spaced spring impelled detents 28 (Figure 3) which register with an annular groove 29 provided in the housing 24 to establish a detachable connection therebetween and still permit their relative rotation with minimum friction.

Rotation of the end cap 22 on the upper extremity 30 of the pilot stem or rod 15' with minimum friction is accomplished by providing a ball 31 in the axial region 32 of a threaded screw 33. The threaded screw 33 engages a correspondingly threaded bore 34 provided axially through the end cap body 22. The threaded screw 33 has a knurled head 35 thereon which is formed integral therewith to enable the rotation of the screw 35 relative to the end cap 22 and the bearing 31, to raise or lower the gauge support housing 24 and the cylindrical support body 16 as an assembled unit. It should be noted that the ball 31 is swaged into the lower end of the screw 33 for free rotation therein so that the end cap 22 with the housing 24 is vertically supported thereon.

A knurled lock nut 36 is provided on the threaded shank of screw 33 to cooperate with the end surface of the cap body 22 to lock the threaded screw 33 in any adjusted position against any accidental change of position therein. This arrangement affords the proper vertical positioning of the cylindrical support body 16 which carries a valve seat engaging member 37 that terminates in a downwardly offset extension having a ball shaped extremity 39 thereon to contact the tapered peripheral valve seat 11 (Figure 3). The valve seat engaging member 37 is detachably associated with the cylindrical support body 16 by means of a collar 40 having a tangential slot 41 therein for the reception of the shank of the valve seat engaging member 37. A threaded knurled screw fastener 42 is axially disposed through the collar 40 to threadedly engage the cylindrical support body 16 (Figure 5) in order to adjustably attach the valve seat engaging member thereto.

In consequence thereof, the screw member 33 carries the ball bearing 31 with the sleeve 20 in adjustable vertical relation (Figure 3) with respect to the pilot 15 to engage the upper extremity 30 thereof so that the spherical shaft extremity 39 of the valve seat engaging member 37 will be in the path of the tapered valve seat 11 for rotary contact therewith. Rotation of the valve seat engaging member 37 is effected by imparting manual rotation to the knurled head 35 of the threaded screw 33 after the latter has been locked in position by the lock nut 36. This imparts rotary displacement to the cylindrical support body 16 which carries the valve seat engaging member 37 together with its spherical extremity 39 in light contact with the valve seat 11 to measure the eccentricity or concentricity thereof. The degree of eccentricity or lack of concentricity of the valve seat 11 is communicated to a gauge 43 which is of standard construction and essentially consists of a pointer 44 mounted relative to a calibrated dial 45 comprising a part of the gauge 43 to communicate the extent to which the valve seat 11 requires reconstruction or has been reconstructed by grinding or lapping or both. The gauge dial 45 has suitable indicia 46 thereon corresponding with the calibrated measurement that the rotary displacement of the pointer 44 indicates in a position of displacement.

The pointer 44 is mounted on a shaft 45 to rotate in confronting relation with the calibrated dial 45 which is protected by a transparent crystal 47 confined in the circular gauge casing 43. The pointer 44 responds to an actuating plunger 48 which has a shoe 49 attached to its free extremity to cooperate with a lever cam 50. The lever cam 50 is pivoted as at 51 to a rod 52 fixedly extending from the gauge casing 53. The pivoted lever cam 50 is interposed between the actuating plunger 48 and the peripheral flange 18 of the cylindrical support body 16 to register any vertical reciprocal movement of the cylindrical support body 16 translated to it by the valve seat engaging member 37—38—39.

The valve seat engaging member 37—38—39 translates the eccentricity or lack of concentricity to the cylindrical support body 16, to raise and lower the pivoted lever cam 50 that transmits corresponding movement to the actuator plunger 48. Now then, the gauge body 43 with its casing 53 is detachably associated with and supported by an angular tubular extension 54 formed integral with the gauge support housing 24 to support the gauge 43 in a convenient angular position for visual reading. With this arrangement, the gauge support housing 24 together with its angular extension 54 is held stationary in a fixed position with the gauge 43 for convenient view by the attendant who imparts manual rotation to the knurled head 35 of the screw 33 which is adjustably anchored in the end cap 22 by means of the lock nut 36.

Manual rotation of the knurled screw head 35 will impart corresponding rotation to the cylindrical support body 16 which carries the valve seat engaging member 37—38—39 in light contact with the valve seat 11. This rotary movement will transmit the irregularities or eccentricity or lack of concentricity of the valve seat 11 to the pointer 44 of the gauge 43 to indicate the extent to which the valve seat 11 requires reconstruction by grinding or lapping or both. It will be apparent that a simple and effective device has been provided which will measure the eccentricity or lack of concentricity or detect the irregularities in a valve seat without requiring the operator to change his position with respect to the indicator that registers the irregularities or the extent of eccentricity or lack of concentricity without requiring the attendant to change his position or view with respect to the indicator 44—45.

While I have illustrated and described a preferred embodiment of this invention, it must be understood that the invention is capable of considerable variation and modification without departing from the spirit of the invention. I, therefore, do not wish to be limited to the precise details of construction set forth, but desire to avail myself of such variations and modifications as come within the scope of the appended claims.

I claim:

1. A valve seat gauge comprising an elongated body having an axial bore for receiving a valve pilot stem, a gauge housing journalled on said elongated body for relative rotation and reciprocation therewith, a gauge associated with said housing, a manual finger grasping extremity on the upper free axial extremity of said housing for rotation relative thereto and in operative connection with said elongated body, means interposed between said elongated body and said gauge to respond to relative reciprocations between said gauge housing and elongated body during relative rotary movement therebetween, and a valve seat contact member on said elongated body to impart relative reciprocations between said elongated body and gauge housing responsive to imperfections in a valve seat rotarily contacted therewith.

2. A valve seat gauge comprising an elongated body having an axial bore for receiving a valve pilot stem, a gauge housing journalled on said elongated body for relative rotation and reciprocation therewith, a gauge associated with said housing, a manual finger grasping extremity on the upper free axial extremity of said housing for rotation relative thereto and in operative connection with said elongated body, lever means interposed between said elongated body and said gauge to respond to relative reciprocations between said gauge housing and elongated body during relative rotary movement therebetween, and a valve seat contact member on said elongated body to impart relative reciprocations between said elongated body and gauge housing responsive to imperfections in a valve seat rotarily contacted therewith.

3. A valve seat gauge comprising an elongated body having an axial bore for receiving a valve pilot stem, a gauge housing journalled on said elongated body for relative rotation and reciprocation therewith, a gauge associated with said housing, a manual finger grasping extremity on the upper free axial extremity of said housing for rotation relative thereto and in operative connection with said elongated body, combined lever and plunger means interposed between said elongated body and said gauge to respond to relative reciprocations between said gauge housing and elongated body during relative rotary movement therebetween, and a valve seat contact member on said elongated body to impart relative reciprocations between said elongated body and gauge housing responsive to imperfections in a valve seat rotarily contacted therewith.

4. A valve seat gauge comprising an elongated body having an axial bore for receiving a valve pilot stem, a gauge housing journalled on said elongated body for relative rotation and reciprocation therewith, a gauge associated with said housing, a manual finger grasping extremity on the upper free axial extremity of said housing for rotation relative thereto and in operative connection with said elongated body, a peripheral flange on said elongated body, means interposed between said elongated body flange and said gauge to respond to relative reciprocations between said gauge housing and elongated body during relative rotary movement therebetween, and a valve seat contact member on said elongated body to impart relative reciprocations between said elongated body and gauge housing responsive to imperfections in a valve seat rotarily contacted therewith.

5. A valve seat gauge comprising an elongated body having an axial bore for receiving a valve pilot stem, a gauge housing journalled on said elongated body for relative rotation and reciprocation therewith, a gauge associated with said housing, a manual finger grasping extremity on the upper free axial extremity of said housing for rotation relative thereto and in operative connection with said elongated body, a peripheral flange on said elongated body, lever means interposed between said elongated body flange and said gauge to respond to relative reciprocations between said gauge housing and elongated body during relative rotary movement therebetween, and a valve seat contact member on said elongated body to impart relative reciprocations between said elongated body and gauge housing responsive to imperfections in a valve seat rotarily contacted therewith.

6. A valve seat gauge comprising an elongated body having an axial bore for receiving a valve pilot stem, a gauge housing journalled on said elongated body for relative rotation and reciprocation therewith, a gauge associated with said housing, a manual finger grasping extremity on the upper free axial extremity of said housing for rotation relative thereto and in operative connection with said elongated body, a peripheral flange on said elongated body, combined lever and plunger means interposed between said elongated body flange and said gauge to respond to relative reciprocations between said gauge housing and elongated body during relative rotary movement therebetween, and a valve seat contact member on said elongated body to impart relative reciprocations between said elongated body and gauge housing responsive to imperfections in a valve seat rotarily contacted therewith.

7. A valve seat gauge comprising an elongated body having an axial bore for receiving a valve pilot stem, a gauge housing journalled on said elongated body for relative rotation and reciprocation therewith, a vertical adjustable top bearing support on said elongated body for contact with a pilot stem in the axial bore of said elongated body, a manual finger grasping extremity on the upper free axial extremity of said housing for rotation relative thereto and in operative connection with said elongated body, a gauge associated with said housing, means interposed between said elongated body and said gauge to respond to relative reciprocations between said gauge housing and elongated body during relative rotary movement therebetween, and a valve seat contact member on said elongated body to impart relative reciprocations between said elongated body and gauge housing 8. A valve seat gauge comprising an elongated body having an axial bore for receiving a valve pilot stem, a gauge housing journalled on said elongated body for relative rotation and reciprocation therewith, a vertical adjustable top bearing support on said elongated body for contact with a pilot stem in the axial bore of said elongated body, a manual finger grasping extremity on the upper free axial extremity of said housing for rotation relative thereto and in operative connection with said elongated body, a gauge associated with said housing, lever means interposed between said elongated body and said gauge to respond to relative reciprocations between said gauge housing and elongated body during relative rotary movement therebetween, and a valve seat contact member on said elongated body to impart relative reciprocations between said elongated body and gauge housing responsive to imperfections in a valve seat rotarily contacted therewith.

9. A valve seat gauge comprising an elongated body having an axial bore for receiving a valve pilot stem, a gauge housing journalled on said elongated body for relative rotation and reciprocation therewith, a vertical adjustable top bearing support on said elongated body for contact with a pilot stem in the axial bore of said elongated body, a manual finger grasping extremity on the upper free axial extremity of said housing for rotation relative thereto and in operative connection with said elongated body, a gauge associated with said housing, combined lever and plunger means interposed between said elongated body and said gauge to respond to relative reciprocations between said gauge housing and elongated body during relative rotary movement therebetween, and a valve seat contact member on said elongated body to impart relative reciprocations between said elongated body and gauge housing responsive to imperfections in a valve seat rotarily contacted therewith.

10. A valve seat gauge comprising an elongated body having an axial bore for receiving a valve pilot stem, a gauge housing journalled on said elongated body for relative rotation and reciprocation therewith, a vertical adjustable top bearing support on said elongated body for contact with a pilot stem in the axial bore of said elongated body, a manual finger grasping extremity on the upper free axial extremity of said housing for rotation relative thereto and in operative connection with said elongated body, a gauge associated with said housing, a peripheral flange on said elongated body, means interposed between said elongated body flange and said gauge to respond to relative reciprocations between said gauge housing and elongated body during relative rotary movement therebetween, and a valve seat contact member on said elongated body to impart relative reciprocations between said elongated body and gauge housing responsive to imperfections in a valve seat rotarily contacted therewith.

11. A valve seat gauge comprising an elongated body having an axial bore for receiving a valve pilot stem, a gauge housing journalled on said elongated body for relative rotation and reciprocation therewith, a vertical adjustable top bearing support on said elongated body for contact with a pilot stem in the axial bore of said elongated body, a gauge associated with said housing, a manual finger grasping extremity on the upper free axial extremity of said housing for rotation relative thereto and in operative connection with said elongated body, a peripheral flange on said elongated body, lever means interposed between said elongated body flange and said gauge to respond to relative reciprocations between said gauge housing and elongated body during relative rotary movement therebetween, and a valve seat contact member of said elongated body to impart relative reciprocations between said elongated body and gauge housing responsive to imperfections in a valve seat rotarily contacted therewith.

12. A valve seat gauge comprising an elongated body having an axial bore for receiving a valve pilot stem, a gauge housing journalled on said elongated body for relative rotation and reciprocation therewith, a vertical adjustable top bearing support on said elongated body for contact with a pilot stem in the axial bore of said elongated body, a gauge associated with said housing, a manual finger grasping extremity on the upper free axial extremity of said housing for rotation relative thereto and in operative connection with said elongated body, a peripheral flange on said elongated body, combined lever and plunger means interposed between said elongated body flange and said gauge to respond to relative reciprocations between said gauge housing and elongated body during relative rotary movement therebetween, and a valve seat contact member on said elongated body to impart relative reciprocations between said elongated body and gauge housing responsive to imperfections in a valve seat rotarily contacted therewith.

FLOYD W. PRESLAN.

REFERENCES CITED

The following references are of record in the file of this patent:

UNITED STATES PATENTS

| Number | Name | Date |
|---|---|---|
| 1,723,529 | Schwieterman | Aug. 6, 1929 |
| 1,792,043 | Scusa | Feb. 10, 1931 |
| 1,876,280 | Dunn | Sept. 6, 1932 |
| 1,891,365 | Albertson et al. | Dec. 20, 1932 |
| 1,997,639 | Hetherington et al. | Apr. 16, 1935 |

FOREIGN PATENTS

| Number | Country | Date |
|---|---|---|
| 541,129 | Great Britain | Nov. 13, 1941 |